T. B., A. G. & G. P. MARCHANT.
ELASTIC TIRE.
APPLICATION FILED APR. 22, 1907.
1,024,090.
Patented Apr. 23, 1912.
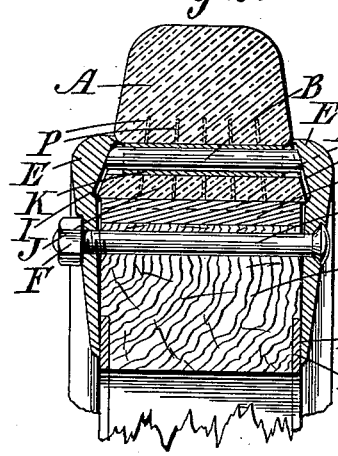
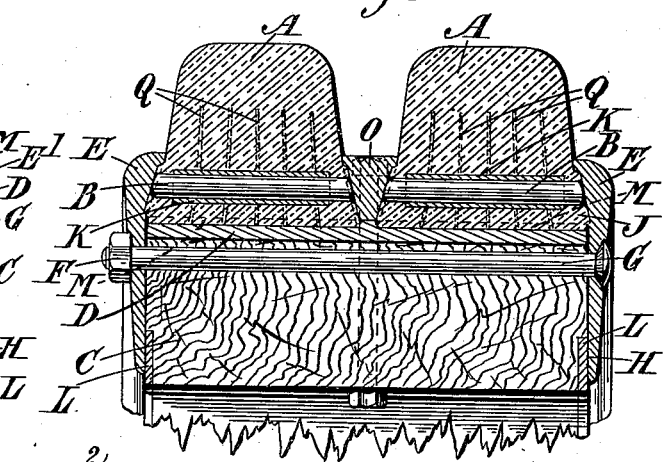
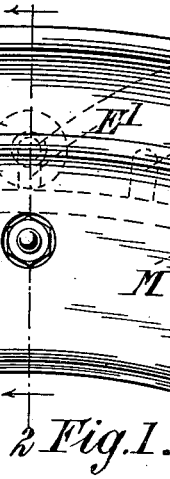

UNITED STATES PATENT OFFICE.

THOMAS BALLARD MARCHANT, ARTHUR GEORGE MARCHANT, AND GEORGE PERCY MARCHANT, OF LONDON, ENGLAND.

ELASTIC TIRE.

1,024,090. Specification of Letters Patent. Patented Apr. 23, 1912.

Application filed April 22, 1907. Serial No. 369,660.

*To all whom it may concern:*

Be it known that we, THOMAS BALLARD MARCHANT, ARTHUR GEORGE MARCHANT, and GEORGE PERCY MARCHANT, subjects of the King of England, residing at London, England, have invented certain new and useful Improvements in or Relating to Elastic Tires, of which the following is a specification.

This invention relates to elastic tires of india rubber or other yielding material and has for one of its chief objects to provide means whereby the resilience of such tires may be increased.

According to this invention the tire is preferably provided with rods or the like in each of a number of radial cross-sections, means being provided whereby these rods can be drawn toward the felly of the wheel so as to compress the base of the tire across its whole width while not allowing it to expand laterally. The compression is not merely carried to that extent which is necessary to properly hold the tire against the felly of the wheel, but to such an extent that the base of the tire becomes much more resilient than the rest of the tire, thereby enhancing the resilience of the tire as a whole. Further, according to this invention canvas or the like may be incorporated in the rubber canvas structure to strengthen it and to offer resistance to the tendency of the outer portion of the tire to move radially outward from the rim when the base of the tire is compressed as referred to above. The canvas or the like is preferably arranged in planes parallel to the plane of the wheel thus preventing circumferential extension of the tire while allowing full compression.

Another feature of this invention is the employment of depressions or pockets in the rim and parts attached thereto into which portions of the tire are forced by compressing the base of the tire as referred to above.

Other features of this invention will be evident from the following description taken in connection with the accompanying drawings which illustrate two methods of carrying this invention into effect.

In the drawings:—Figure 1 shows a side elevation partly in section of a tire and wheel rim constructed according to this invention; Fig. 2 is a section on line 2—2 of Fig. 1, and Fig. 3 is a modification of the invention.

Like letters indicate like parts throughout the drawings.

In carrying this invention into effect according to the modification shown in Figs. 1 and 2 a tire A of india rubber or other suitable material has stout rods B passing through it in each of successive radial cross sections. These rods are preferably placed nearer the rim of the wheel than the tread of the tire. The felly C of the wheel may be of wood and a metal rim D may be provided surrounding it. Clamping members are provided, these preferably consisting of rings E of wedge-shaped cross section. These clamping members may be drawn toward each other by adjusting a nut F on the bolt G, the points H on the clamping members E thus acting as fulcrums. The clamping members E have their surfaces I, which engage with the ends of the rods B, inclined as shown so that on the clamping members approaching one another each rod B is caused to move parallel to the axis of the wheel toward the rim of the wheel. For the purpose of guiding the rods B in this movement, and for the prevention of creeping, slots E' are provided in the clamping members E''. The rods B in conjunction with the slots E' form efficient driving means between the rim and the tire. In this manner the part J of the tire A is compressed this same portion being simultaneously compressed by the approaching clamping members E. This compression is carried to an extent much greater than is necessary for merely holding the tire firmly against the felly of the wheel and by such compression of the rubber in all directions the resiliency of the tire as a whole is greatly increased.

The rods B are preferably surrounded by a somewhat shorter sleeve K of material on which the rubber will not exert chemical action as it is preferable to vulcanize the tire after the insertion of the rods. If necessary the felly C may be provided with metal rings L to shield it from the rubbing of the fulcrums H. Depressions M are provided in the rim opposite each alternate bolt B into which portions of the tire are forced by the clamping members being tightened up. If desired similar depressions may be provided at other positions on the rim and depressions such as $M^1$ may be provided in the side flanges E for a similar purpose.

The slots E¹ which guide the rods B in their motion toward the rim of the wheel are equivalent to such depressions M¹. This arrangement of depressions or pockets into which the tire can be forced is of particular advantage with a tire of the kind herein described, inasmuch as at the end of that diameter of the wheel at which at any moment the compression of the tire is being experienced, there occurs a forcing of the rubber into the aforesaid depressions or pockets additional to that which is brought about by the normal actions of the rods; consequently the safeguard against "creeping" which in this tire is afforded by these depressions or pockets is automatically enhanced by the action of the load at just the point in the tire where the need for checking the "creeping" is most imperative.

For the purpose of preventing compression at any point causing expression at any other point or "gathering" the tire is provided with canvas or wire gauze or the like incorporated within it. This canvas or the like may conveniently take the form of washers P surrounding the rods B as shown in Fig. 2. By arranging the canvas in planes parallel to the plane of the wheel circumferential extension of the tire is prevented while allowing full compression.

In Fig. 3 this invention is shown applied to a wheel having two tires, the construction differing for this purpose from that shown in Fig. 1 in having a ring O lying between the two tires. This ring is wedge-shaped in cross section and the rods B of both tires are thrust against it by the tightening up of the outer clamping members E as has been described above in connection with the modification shown in Figs. 1 and 2.

The tires have canvas inserted in them as in the modification shown in Figs. 1 and 2 but in this case it is in the form of circumferential strips Q parallel to the plane of the wheel.

In Fig. 3 in contradistinction to Fig. 2 the clamping members are represented as being drawn together so as to show the compression of the rubber against the wheel rim.

It is obvious that various modifications may be made in the methods of carrying this invention into effect.

The canvas or like material incorporated in the tire may be arranged in any suitable manner, those shown in the drawings and referred to above being only methods which will be found to be particularly convenient.

What we claim as our invention and desire to secure by Letters Patent is:—

1. The combination with a vehicle wheel and its rim, of an elastic tire, rods passing through said tire, clamping rings wedge-shaped in cross-section arranged laterally of the rim and tire and provided with slots into which the rods project and having inclined surfaces against which the ends of the rods will bear and by which they are caused to move toward the rim of the wheel, and bolts passing through the rim of the wheel and said rings, all coöperating substantially as and for the purposes specified.

2. The combination with a vehicle wheel and its rim, of an elastic tire, rods passing through said tire, sleeves surrounding said rods, clamping rings wedge-shaped in cross-section arranged laterally of the rim and tire and provided with slots into which the rods project and having inclined surfaces against which the ends of the rods will bear and by which they are caused to move toward the rim of the wheel, and bolts passing through the rim of the wheel and said rings all coöperating substantially as and for the purpose specified.

3. The combination with a vehicle wheel and its rim, said rim having depressions M, of an elastic tire, rods passing through said tire, clamping rings wedge-shaped in cross-section arranged laterally of the rim and tire and provided with inclined surfaces against which the ends of the rods will bear and by which they are caused to move toward the rim of the wheel, and bolts passing through the rim of the wheel and said rings, all coöperating substantially as and for the purposes specified.

4. The combination with a vehicle wheel and its rim, of an elastic tire, rods passing through said tire, clamping rings wedge-shaped in cross section arranged laterally of the rim and tire and provided with slots into which the rods project and having inclined surfaces against which the ends of the rods will bear and by which they are caused to move toward the rim of the wheel, and said rings having depressions M' for the purpose stated, and bolts passing through the rim of the wheel and said rings, all coöperating substantially as and for the purpose specified.

In testimony whereof we have signed our names to this specification in the presence of two subscribing witnesses.

THOMAS BALLARD MARCHANT.
ARTHUR GEORGE MARCHANT.
GEORGE PERCY MARCHANT.

Witnesses:
HERBERT BURRAGE,
H. D. JAMESON.